United States Patent
Yan et al.

(10) Patent No.: US 7,960,072 B2
(45) Date of Patent: Jun. 14, 2011

(54) MEA WITH CATALYST FOR OXIDATION OF CARBON MONOXIDE

(75) Inventors: Susan G Yan, Fairport, NY (US); Hubert A Gasteiger, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1510 days.

(21) Appl. No.: 10/407,609

(22) Filed: Apr. 4, 2003

(65) Prior Publication Data

US 2004/0197627 A1  Oct. 7, 2004

(51) Int. Cl.
*H01M 4/02* (2006.01)
*H01M 4/36* (2006.01)
*H01M 4/90* (2006.01)
*H01M 2/08* (2006.01)
*H01M 2/14* (2006.01)

(52) U.S. Cl. .................. 429/527; 429/509; 429/530

(58) Field of Classification Search .............. 429/40, 429/34, 38, 39, 44, 527, 508, 509, 530
See application file for complete search history.

(56) References Cited

U.S. PATENT DOCUMENTS

| | | | |
|---|---|---|---|
| 3,134,697 A | 5/1964 | Niedrach et al. | |
| 3,631,073 A | 12/1971 | Cohn et al. | |
| 4,175,165 A * | 11/1979 | Adlhart | 429/30 |
| 4,467,050 A * | 8/1984 | Patel et al. | 502/330 |
| 5,217,821 A * | 6/1993 | Landsman et al. | 429/13 |
| 5,272,017 A | 12/1993 | Swathirajan et al. | |
| 5,346,780 A * | 9/1994 | Suzuki | 429/42 |
| 5,350,643 A * | 9/1994 | Imahashi et al. | 429/33 |
| 5,474,857 A * | 12/1995 | Uchida et al. | 429/33 |
| 5,482,680 A | 1/1996 | Wilkinson et al. | |
| 5,561,000 A * | 10/1996 | Dirven et al. | 429/42 |
| 5,702,836 A * | 12/1997 | Ma et al. | 429/13 |
| 5,795,669 A * | 8/1998 | Wilkinson et al. | 429/40 |
| 5,863,673 A * | 1/1999 | Campbell et al. | 429/44 |

(Continued)

FOREIGN PATENT DOCUMENTS

EP  0 736 921 B1  7/1998

(Continued)

OTHER PUBLICATIONS

Enhanced electrocatalysis of oxygen reduction on platinum alloys in proton exhange membrane fuell cells; J. Electroanal. Chem.; Elsevier Sequioa S.A., Lausanne; JEC 02771; Sanjeev Mukerjee and Supramaniam Srinivasan; Center for Electrochemical Systems and Hydrogen Research, Texas Engineering Experiment Station, Texas A&M University System, College Station, TX 77843-3402 (USA) (Received Jan. 29, 1993, in revised form Feb. 15, 1993); 357 (1993) pp. 201-224 (23 pages).

(Continued)

*Primary Examiner* — Patrick Ryan
*Assistant Examiner* — Julian Mercado
(74) *Attorney, Agent, or Firm* — Harness, Dickey & Pierce, P.L.C.

(57) ABSTRACT

A fuel cell comprising an ionically conductive membrane with an electrode. The electrode is disposed adjacent the ionically conductive membrane and an electrically conductive member is disposed adjacent the electrode. The fuel cell further comprises a group of catalyzed particles that is capable of catalyzing a gas phase oxidation reaction and an electrochemical oxidation reaction. The catalyzed particles are disposed on at least one of the electrode and electrically conductive member.

13 Claims, 4 Drawing Sheets

U.S. PATENT DOCUMENTS

| | | | |
|---|---|---|---|
| 5,874,182 A * | 2/1999 | Wilkinson et al. | 429/30 |
| 6,277,513 B1 | 8/2001 | Swathirajan et al. | |
| 6,361,896 B1 | 3/2002 | Eberle et al. | |

FOREIGN PATENT DOCUMENTS

| | | |
|---|---|---|
| GB | 1116585 | 11/1965 |
| WO | WO 97/40542 | 10/1997 |

OTHER PUBLICATIONS

Catalysis for Low Temperature Fuel Cells; Part II: The Anode Challenges; T.R Ralph and M.P. Hogarth; Johnson Matthey Technology Centre, Blounts Court, Sonning Common, Reading RG4 9NH, U.K.; Platnum Metals Rev., 2002, 46,(3); pp. 117-135 (19 pages).

* cited by examiner

US 7,960,072 B2

MEA WITH CATALYST FOR OXIDATION OF CARBON MONOXIDE

FIELD OF THE INVENTION

The present invention relates to electrochemical cells. More particularly, the present invention relates to a preferential oxidation catalyst for such cell.

BACKGROUND OF THE INVENTION

Fuel cells have been proposed as a power source for electric vehicles and other applications. One known fuel cell is the proton exchange membrane fuel cell (PEMFC) that includes a membrane electrode assembly (MEA) comprising a thin, solid polymer membrane-electrolyte having an anode on one face of the membrane electrolyte and a cathode on the opposite face of the membrane-electrolyte. The MEA is sandwiched between a pair of electrically conductive fluid distribution elements which serve as current collectors for the anode and cathode. Flow fields are provided for distributing the fuel cell's gaseous reactants over surfaces of the respective anode and cathode. The electrically conductive fluid distribution elements may themselves form a part of the flow field in the form of appropriate channels and openings therein for distributing the fuel cell's gaseous reactants over the surfaces of the respective anode and cathode.

In a fuel cell, the gaseous reactant at the anode preferentially comprises a fuel stream of pure $H_2$. An alternative to using pure $H_2$ as the gaseous reactant is to use a reformate fuel stream that is produced by converting a hydrocarbon-based fuel such as methanol or gasoline. This reformate fuel stream, in addition to containing $H_2$, also contains impurities such as carbon dioxide ($CO_2$), nitrogen ($N_2$), and carbon monoxide (CO). For fuel cells operating at temperatures below 200 C, and especially for the PEMFC operating at temperatures around 100 C, it is known that CO, even at levels of 1-10 ppm, severely degrades a platinum electrocatalyst present in the anode and cathode electrodes. This degradation leads to a significant reduction in fuel cell performance, and is even more pronounced at the lower operating temperatures that are desirable.

SUMMARY OF THE INVENTION

With the above deficiencies in mind, the present invention provides a fuel cell that is proficient at effectively tolerating the amount of CO in the fuel stream so that a satisfactory performance can be achieved. Such fuel cell comprises an ionically conductive membrane with an electrode. The electrode is disposed between the ionically conductive membrane and an electrically conductive member. The fuel cell further comprises a group of catalyzed particles that is capable of catalyzing a gas phase oxidation reaction and preferably is capable of catalyzing an electrochemical oxidation reaction. The catalyzed particles are disposed on at least one of the electrode and electrically conductive member.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
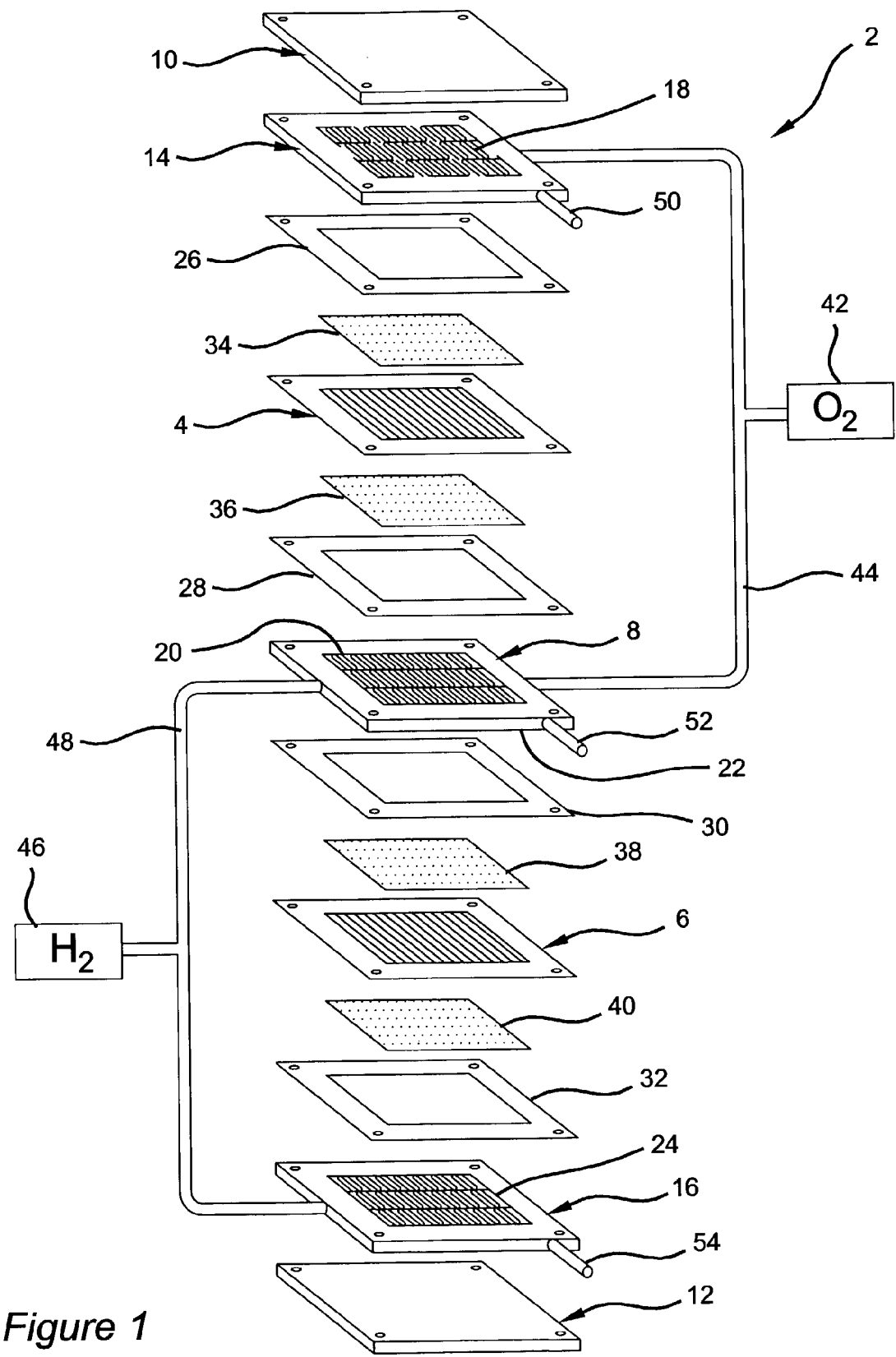
FIG. 1 is a schematic, exploded illustration of a PEMFC stack (only two cells shown)

FIG. 1 depicts a two cell, bipolar fuel cell stack 2 having a pair of membrane-electrode-assemblies (MEAs) 4 and 6 separated from each other by an electrically conductive fluid distribution element 8. The MEAs 4 and 6 and electrically conductive fluid distribution element 8, are stacked together between stainless steel clamping plates, or end plates 10 and 12, and end contact elements 14 and 16. The end contact elements 14 and 16, as well as both working faces of the electrically conductive fluid distribution element 8, contain a plurality of grooves or channels 18, 20, 22, and 24, respectively, for distributing fuel and oxidant gases (i.e. $H_2$ and $O_2$) to the MEAs 4 and 6. Nonconductive gaskets 26, 28, 30, and 32 provide seals and electrical insulation between the several components of the fuel cell stack. Gas permeable, electrically conductive members, typically carbon/graphite diffusion papers 34, 36, 38, and 40, press up against the electrode faces of the MEAs 4 and 6. The end contact elements 14 and 16 press up against the electrically conductive members 34 and 40 respectively, while the electrically conductive fluid distribution element 8 presses up against the electrically conductive member 36 on the anode face of MEA 4, and against electrically conductive member 38 on the cathode face of MEA 6. Oxygen is supplied to the cathode side of the fuel cell stack from storage tank 42 via appropriate supply plumbing 44, while the $H_2$ is supplied to the anode side of the fuel cell from storage tank 46, via appropriate supply plumbing 48. Alternatively, ambient air may be supplied to the cathode side as an oxygen source and reformate to the anode side from a methanol or gasoline reformer, or the like. Exhaust plumbing (not shown) for both the $H_2$ and $O_2$ sides of the MEAs 4 and 6 will also be provided. Additional plumbing 50, 52, and 54 is provided for supplying liquid coolant to the electrically conductive fluid distribution element 8 and end plates 14 and 16. Appropriate plumbing for exhausting coolant from the electrically conductive fluid distribution element 8 and end plates 14 and 16 is also provided, but not shown.

Figure 2:
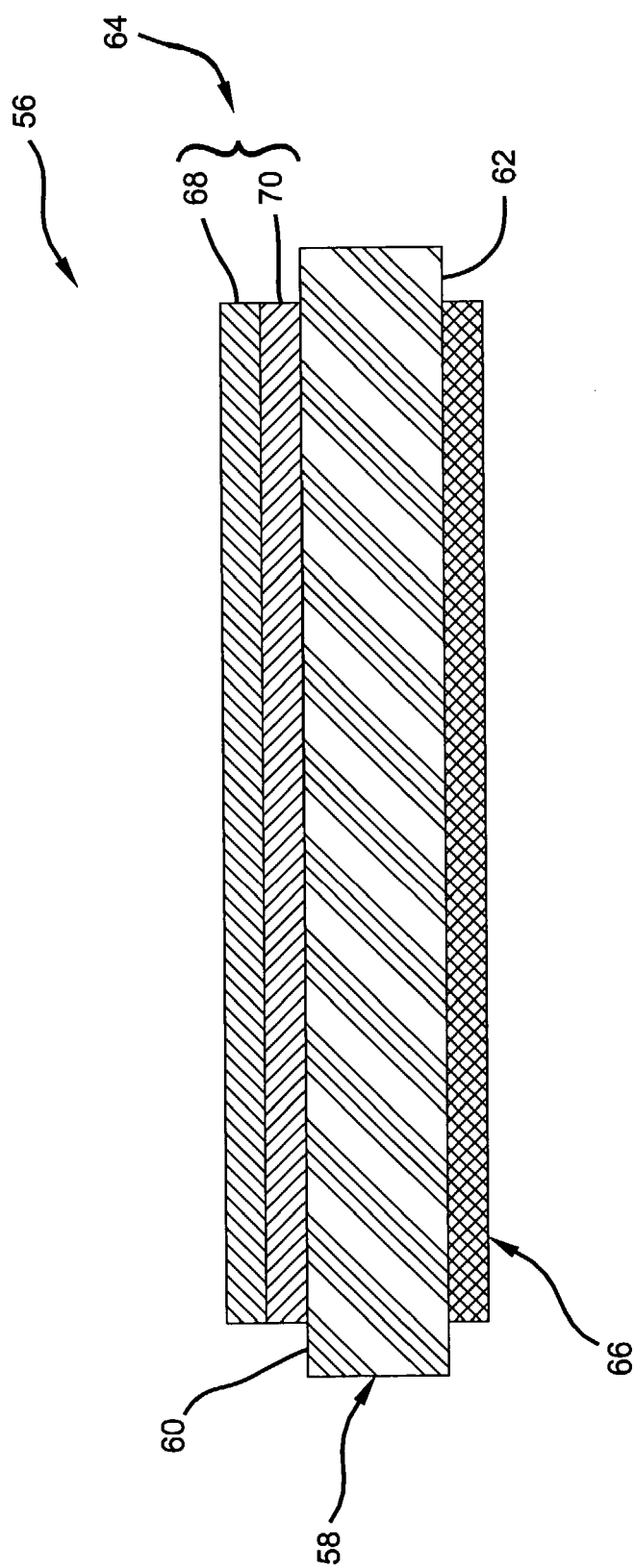
FIG. 2 is a cross-sectional view of a membrane electrode assembly according to a first embodiment of the present invention.

Now referring to FIG. 2, a first embodiment of the present invention will be described. As can be seen in FIG. 2, an MEA 56 for use in a fuel cell of the present invention comprises an ionically conductive member 58 including an anodic surface 60 and a cathodic surface 62. Adjacent the anodic surface 60 and cathodic surface 62 of the ionically conductive member 58 is an anode electrode 64 and cathode electrode 66, respectively. Although not depicted in FIG. 2, the MEA 56 is preferably sandwiched between electrically conductive members and electrically conductive fluid distribution elements.

The ionically conductive member 58 is preferably a solid polymer membrane electrolyte, and more preferably a proton exchange membrane (PEM). Polymers suitable for such membrane electrolytes are well known in the art and are described in U.S. Pat. Nos. 5,272,017 and 3,134,697 and elsewhere in the patent and non-patent literature. It should be noted, however, that the composition of the ionically conductive member 58 may comprise any of the proton conductive polymers conventionally used in the art. Preferably, perfluorinated sulfonic acid polymers such as NAFION® are used. Furthermore, the polymer may be the sole constituent of the membrane or may be carried in the pores of another material.

In accordance with the first embodiment, the anode electrode 64 is comprised of a plurality of layers in ionomeric contact with the ionically conductive member 58. It should be noted that although only two layers are shown in FIG. 2, it is not out of the scope of the present invention to employ an anode electrode 64 that includes a greater number of layers. A first layer 68 of the anode electrode 64 preferably serves as a gas phase oxidation layer as well as an electrochemically active layer. More particularly, the first layer 68 is catalytically active in the preferential oxidation (PrOx) of carbon monoxide (CO), per reaction (1) below. Such first layer is also catalytically active in the oxidation of $H_2$, per reaction (2) below, provided that an ionically conductive constituents is also present. Preferably, an electrically conductive constituent is also present. The first layer 68 is also hereinafter referred to as PrOx layer.

$$CO + \tfrac{1}{2}O_2 \rightarrow CO_2 \tag{1}$$

$$H_2 \rightarrow 2H^+ + 2e^- \tag{2}$$

Furthermore, it should be noted that the MEA 56 according to the first embodiment will be employed in a fuel cell that has a humidified environment. As such, it should be understood that the PrOx layer 68 of the anode electrode 64 is capable of performing the following reaction shown below:

$$CO + H_2O \rightarrow CO_2 + 2H^+ + 2e^- \tag{3}$$

In the presence of the PrOx catalyst, some $H_2$ is oxidized to $H_2O$ in a typical combustion-type reaction. However, the PrOx catalyst is selective for primarily oxidation of CO to $CO_2$, and significantly less selective for oxidation of $H_2$ to $H_2O$.

As can be appreciated, in the presence of ionically conductive material, transport of $H^+$ is possible. Advantageously, the PrOx catalyst of the present invention causes electrochemical oxidation of $H_2$ to $H^+$ facilitated by the proton (ionically) conductive material. In addition, in the presence of electrically conductive material, released electrons from equations 2 and 3 are transported away from the catalyst sites and adds to the electrochemical function of the anode. A PrOx black metal catalyst, such as PtFe black metal, is itself electrically conductive.

The composition of the PrOx layer 68 preferably comprises catalyst-coated carbon or graphite particles embedded in a polymer binder which, like the polymer membrane, is preferably a proton conductive material such as NAFION®. The PrOx layer 68 includes a catalyst effective for oxidation of CO to $CO_2$, desirably, PtM, where M comprises one or more non-noble metals, and alloys and mixtures thereof. Examples include PtFe, PtSn, PtMo, and the like, and alloys and mixtures thereof. The PrOx layer 68 will most preferably include a platinum iron (PtFe) alloy as the catalyst. Other PrOx catalysts are metals such as Au supported on metal oxide supports, preferably transition metal oxide supports. PtFe is a very effective low temperature (i.e., 60-80° C.) preferential oxidation catalyst as well as an electrochemically active catalyst. Other suitable low-temperature PrOx catalysts include transition-metal-oxide supported Au and other noble metals. A preferred catalyst loading in the PrOx layer 68 is about half of a milligram per square centimeter. The PtFe catalyst is preferably supported on carbon or on other suitable electronically conductive support-materials.

Preferably, although not shown in FIG. 2, the PrOx layer 68 is adjacent a gas permeable, electrically conductive member (hereinafter gas diffusion medium). When the hydrogen rich fuel stream diffuses through the gas diffusion medium and contacts the PrOx layer 68, any CO present in the fuel stream will be oxidized to $CO_2$. Moreover, as stated above, the PrOx layer 68 also functions as a electrochemical oxidation layer so that the hydrogen fuel is oxidized to produce protons ($H^+$) and electrons. As such, the PrOx layer 68 functions with a unique dual capability of oxidizing eliminating the CO and producing electrons to enhance a current density produced by the fuel cell.

As stated above, the PrOx layer 68 is preferably adjacent a gas diffusion medium. Disposing the PrOx layer 68 adjacent the diffusion media advantageously exposes the PrOx layer 68 to the fuel stream first so that the CO is oxidized before exposure to a second layer 70 or any other of the plurality of layers that may comprise the anode electrode 64. This is because the second layer 70, or any other layer of the plurality of layers adjacent the ionically conductive member 58, is comprised of a catalyst whose primary function is the electrochemical oxidation of $H_2$, but is susceptible to the CO attaching itself to the catalyst and inhibiting the electrochemical oxidation reaction. As such, exposing the PrOx layer 68 to the fuel stream first protects the second layer 70 from the CO and enables the second layer 70 to enhance the electrochemical oxidation of $H_2$.

The composition of the second layer 70, or any other layer of the plurality of layers, is comprised of catalyst-containing carbon or graphite particles dispersed in a proton conductive binder such as NAFION that are catalytically active in the electrochemical oxidation of hydrogen. Preferably, the catalyst of the second layer 70 is selected from the group of Pt, PtRu, PtPd, Pd, any other noble metal catalyst such as Pd, Ir, Rh, Os, Au, and Ag and the like, and mixtures and alloys thereof. A preferred catalyst loading for the second layer, or any other layer of the plurality of layers, is on the order of one half of a milligram per square centimeter, and more preferably, is on the order of 0.1 to 0.5 milligram of active material, e.g., noble metal, per square centimeter.

It should be noted that the catalyst loading in the second layer 70 can be reduced substantially due to the effect of the PrOx layer effectively oxidizing the CO. A conventional fuel cell requires a higher catalyst loading in order to combat CO and provide a satisfactory current density. As the CO is effectively oxidized by the PrOx layer 68, a lower loading can now be utilized and still achieve a satisfactory current density since the catalyst in the second layer 70 will not be exposed to significant CO. Furthermore, a reduced loading provides an advantage in that less of the expensive catalyst is used.

After the fuel stream is exposed to the PrOx layer 68 and the CO is oxidized, the fuel stream contacts the second layer 70 and the electrochemical oxidation catalyst electrochemically oxidizes $H_2$ to produce $H^+$ and electrons. Although the function of the second layer 70 is preferably the electrochemical oxidation of $H_2$, the second layer 70 should not be limited thereto. The second layer 70 may also comprise a catalyst that has the dual capability of eliminating CO and producing electrons. It should be understood, however, that the PrOx layer 68 including the PtFe catalyst effectively oxidizes the CO, and therefore, the second layer 70 does not need to function similarly to the PrOx layer 68.

Protons produced from the electrochemical oxidation of $H_2$ at the anode 64 then migrate through the PEM 58 to the cathode electrode 66 where oxygen gas or oxygen in ambient air is supplied, and the oxygen is reduced. The reduced oxygen combines with the protons to produce water and take up electrons released by the anode and passed to the cathode via an external circuit. More specifically, the following reaction occurs to complete the electrochemical reaction of the fuel cell:

$$O_2 + 4e^- + 4H^+ \rightarrow 2H_2O \quad (4)$$

The cathode electrode 66 is comprised of a catalyst that is electrochemically active to the reduction of oxygen. In this regard, the cathode electrode 66 preferably comprise catalyst-coated carbon or graphite particles embedded in a polymer binder which, like the polymer membrane, is a proton conductive material such as NAFION®. The catalyst will preferably comprise Pt, Pt alloys, Pd, or any other noble metal catalyst sufficient to catalyze the reduction of $O_2$.

In a variation of the first embodiment, a single layer anode electrode may be employed that combines the effects of the PrOx layer 68 and the second layer 70. This can be accomplished by producing an anode electrode that comprises a mixture of a first group of catalyst coated carbon or graphite particles and a second group of catalyst coated carbon or graphite particles. The first group of particles includes PtFe supported on the carbon or graphite particles to catalyze the oxidation of CO. The second group of particles includes a catalyst effective for the electrochemical oxidation of $H_2$. The mixture of particles is preferably embedded in a polymer membrane such as NAFION. The catalyst of the second group of particles is selected from the group consisting of Pt, PtRu, Pd, PtPd or any other noble metal catalyst or mixtures or alloys thereof suitable for the oxidation of $H_2$, as identified above. Utilizing a mixture of the PrOx catalyst and electrochemically active catalyst would provide the same advantages as the multilayered anode 64, but would also provide an advantage of a simplified manufacturing process due to only providing a single layer.

Although the anode electrodes of the first embodiment provide the distinct advantage of oxidizing the CO, the catalyst of the second layer 70 or second group of particles, that is the catalyst proficient for catalyzing the electrochemical oxidation of $H_2$, may still be exposed to a small amount of CO. This small amount of CO may attach itself to the electrochemically active catalyst and inhibit the electrochemical oxidation of $H_2$. In order to overcome this, it may be desirable to utilize an air bleed technique. The air bleed technique can be used to oxidize any residual CO in the fuel stream by bleeding oxygen or air directly into the fuel stream just before contact with the anode electrode. In typical fuel cells, an air bleed of 2-4% of the volume of the reformate is required to obtain the performance observed in a pure hydrogen fuel stream if the fuel stream is contaminated with 100 ppm CO. The anode electrode of the present invention which employs a PrOx catalyst in combination with an electrocatalyst, however, facilitates the use of an air bleed of only 0.5-1%. If the concentration of CO exceeds 100 ppm, an increased air bleed of 2-4% may be utilized, if desired.

Figure 3:
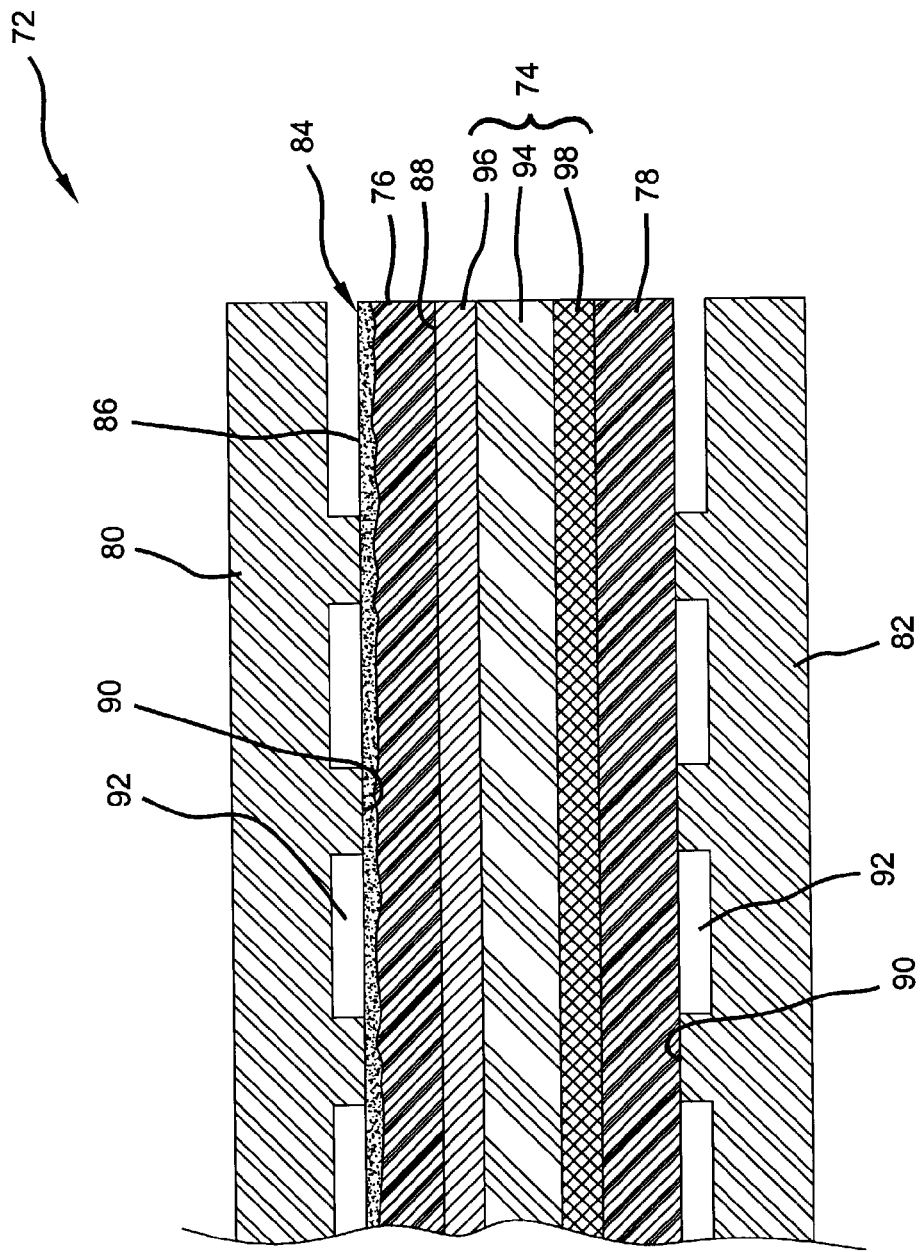
FIG. 3 is a cross-sectional view of a fuel cell according to a second embodiment of the present invention.

Now referring to FIG. 3, a second embodiment of the present invention will be described. As can be seen in FIG. 3, a fuel cell 72 including an MEA 74, electrically conductive members 76 and 78, and electrically conductive fluid distribution elements 80 and 82 is depicted. The PrOx catalyst 84, capable of facilitating and enhancing the reduction of CO, is disposed on a surface 86 of the electrically conductive member 76 that is adjacent the flow field of the electrically conductive fluid distribution element 80. It should be noted, however, that the PrOx catalyst may also be disposed on a surface 88 of the electrically conductive member 76 that is adjacent the MEA 74.

The electrically conductive members 76 and 78 are preferably gas diffusion media that are comprised of carbon paper, carbon cloth, or carbon foams that are in electrical contact with lands 90 that define channels 92 of the electrically conductive fluid distribution elements 80 and 82. The electrically conductive fluid distribution elements 80 and 82, or bipolar plates 80 and 82, may be any bipolar plate known in the art. Preferable materials for use as the bipolar plates 80 and 82 include steel, aluminum, titanium, a composite material, or a polymeric material. The composite material may further include carbon fibers, graphite fibers, steel fibers, or any other electrically conductive material which facilitates electrical conductivity.

The MEA 74 is comprised of an ionically conductive member 94 which is preferably a solid polymer membrane electrolyte, and more preferably a PEM. The anode electrode 96 and cathode electrode 98 of the MEA 74 are preferably comprised of catalyzed carbon or graphite particles dispersed in an ionomer binder such as NAFION. Preferably, the catalyst is selected from the group of Pt, Pd, PtRu, PtPd, or any other noble metal catalyst or alloy thereof, as identified above and capable of catalyzing the electrochemical oxidation of $H_2$ and the electrochemical reduction of $O_2$.

The PrOx catalyst 84 may be supported on the gas diffusion medium 76 in a number of ways. Preferably, the PrOx catalyst 84 is disposed as a "black". In other words, the metal PrOx catalyst 84 is supported on the carbon fibers of the diffusion media 76 with a small amount of binder. For example, a mixture of 90% by weight PrOx catalyst 84 and 10% by weight binder may be used but should not be limited thereto. It should be noted that as much as 60% by weight binder may be used, but it is preferable that binder be present in an amount of to 20% by weight binder. In one embodiment, binder is not used. Utilizing a small amount of binder ensures that electrical conductivity is facilitated between the fibrous electrically conductive gas diffusion medium 76 and electrically conductive bipolar plate 80. This is also facilitated by the PrOx catalyst 84 also being electrically conductive and in electrical contact with the gas diffusion medium 76 and bipolar plate 80.

The preferred PrOx catalyst 84 is selected from PtFe, PtSn, Au, and alloys and mixtures thereof, as identified above. Any binder that can withstand the heat, humidity, and acidity of the fuel cell environment may be used. It is preferable, however, that binders selected from the group of polytetrafluoroethylene, ionomer such as NAFION, and Kynar be used.

The PrOx catalyst 84 may also be disposed onto the diffusion media 76 by supporting it on carbon or graphite particles dispersed in a binder. Another alternative is the PrOx catalyst 84 may be supported on a nonconductive refractory oxide support particle such as alumina, silica, metal oxides, and transition metal oxides such as iron oxide, dispersed in a binder. It should be noted, however, that in order to facilitate electrical conductivity, electrically conductive particles such as carbon, graphite, and silicon carbide should also be dispersed in the binder along with the refractory oxide supported PrOx catalyst to electrically connect the diffusion media 76 and bipolar plate 80. As was the case above, up to 60% by weight of a binder such as polytetrafluoroethylene, an ionomer such as NAFION, and Kynar may be utilized, but it is preferable that 0-20% by weight binder be utilized.

As in the first embodiment, the main aspect of the second embodiment is the selective oxidation of CO. Disposing the PrOx catalyst 84 adjacent the flow field defined by the lands 90 and channels 92 directly exposes the CO contained in the fuel stream to the PrOx catalyst 84. In the presence of an air-bleed into the reformate (preferably 0.5-2% vol.) the CO is then preferentially oxidized to $CO_2$ and the anode 96 of the MEA 94 is protected from a fuel stream containing the CO that can attach itself to the electrochemical oxidation catalyst. As such, the rate of the electrochemical oxidation of hydrogen at the anode 96 can be enhanced.

In a variation of the second embodiment, the anode 64 of the first embodiment may be utilized in addition to the PrOx catalyst 84 disposed on the diffusion media 76. Such a configuration further ensures that the CO will be oxidized and the efficiency of the fuel cell 72 will be further enhanced.

Figure 4:
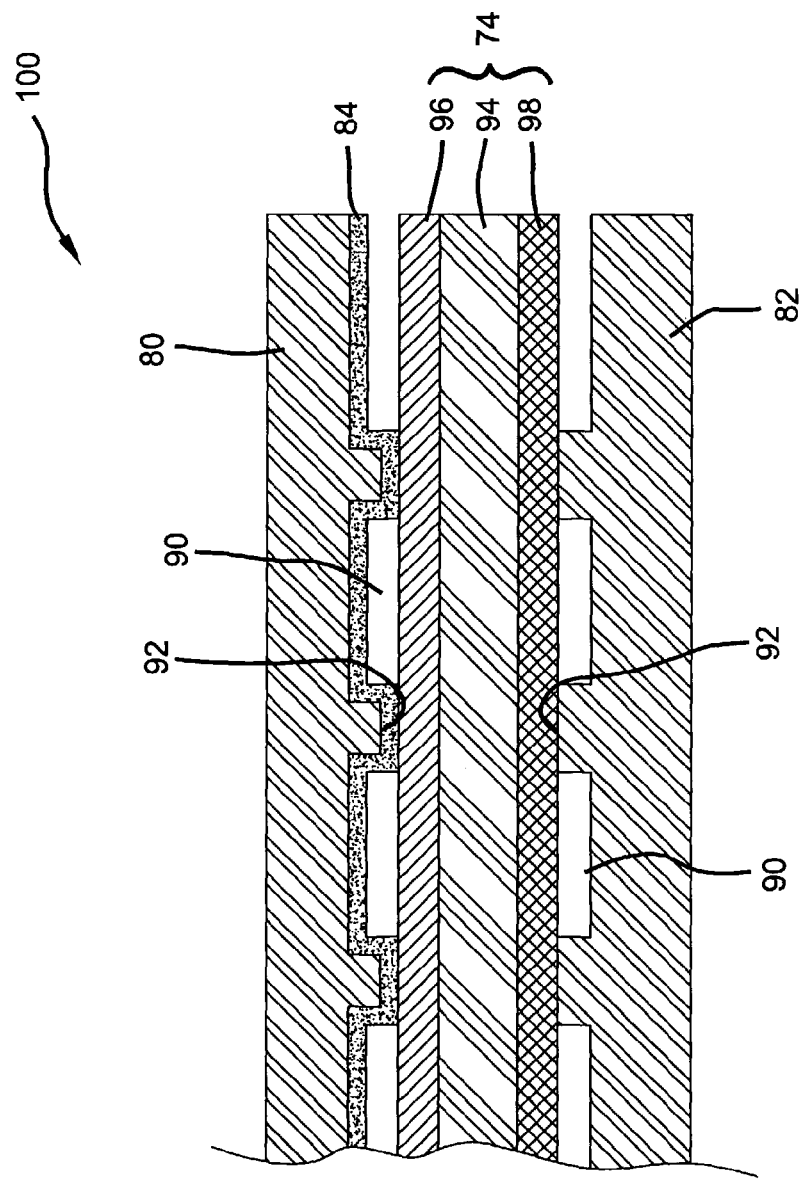
FIG. 4 is a cross-sectional view of a fuel cell according to a third embodiment of the present invention.

In FIG. 4, a fuel cell 100 including the MEA 74 and bipolar plates 80 and 82 is shown according to a third embodiment of the present invention. In the third embodiment, the PrOx catalyst 84 is coated onto at least the channels 90, and preferably the channels 90 and lands 92 of the bipolar plate 80. Preferably, the PrOx catalyst 84 coated on the channels 90 and lands 92 of the bipolar plate 80 is selected from the group of PtFe, PtSn, Au and the like, and alloys and mixtures thereof, as identified above. In order to deposit the PrOx catalyst 84 onto the bipolar plate 80, any method such as electroplating, physical vapor deposition, or the like may be used.

A configuration in which the PrOx catalyst 84 is deposited onto the lands 92 and channels 90 of the bipolar plate 80 directly exposes any CO present in the fuel stream to the PrOx catalyst 84 so that the CO is oxidized to $CO_2$. As such, the anode 96 is free to perform the electrochemical oxidation of hydrogen unimpeded which increases the efficiency of the fuel cell 100.

Although the gas diffusion media 76 and 78 are not shown in FIG. 4, it is within the scope of the present invention to include the gas diffusion media 76 and 78 in the third embodiment. Furthermore, it is within the scope of the present invention to utilize gas diffusion media 76 and 78 including another PrOx catalyst layer 84 thereon in addition to the PrOx catalyst 84 deposited on the anodic surface bipolar plate 80. Still furthermore, it is within the scope of the present invention to utilize an anode electrode 64 as taught in the first embodiment in addition to the PrOx catalyst 84 coated on the bipolar plate 80.

An example comparing the multilayered MEA according to the first embodiment of the present invention and a single layered reference MEA will now be described. The reference MEA sample (MEA #1) includes a polymer membrane electrolyte (Nafion 112 from Dupont) with an anode electrode and cathode electrode disposed on opposing surfaces of the membrane electrolyte. The anode electrode includes a loading of 0.45 milligram per square centimeter of PtRu. The PtRu is supported on carbon from Tanaka, Japan) and the cathode electrode includes a loading of about one half milligram per square centimeter of Pt supported on Vulcan carbon (from Tanaka, Japan).

The test MEA (MEA #2) according to the first embodiment is comprised of an anode electrode including a PrOx layer including PtFe supported on carbon (20 wt % PtFe supported on Vulcan carbon) and a second layer of PtRu supported on carbon (56 wt % PtRu supported on carbon from Tanaka, Japan) which is coated directly onto the polymer membrane electrolyte membrane (Nafion 112 from Dupont). Both layers are in intimate ionomeric contact with the membrane and are electrochemically active. The anode electrode catalyst loadings comprise 0.25 milligram per square centimeter of PtRu, divided among PtFe and PtRu and 0.20 milligram per square centimeter of PtFe. The cathode electrode consists of a single layer of the Pt/Vulcan (from Tanaka, Japan).

Both the reference MEA (MEA #1) and the bi-layer MEA (MEA #2) were tested with a baseline fuel stream consisting of 65% $H_2$ in $N_2$, and air on the cathode side. Each MEA was also tested using a reformate fuel stream consisting of 65% $H_2$, 25% $CO_2$, 10% $N_2$ and 100 ppm CO. Furthermore, each MEA was tested utilizing the reformate fuel stream in conjunction with a 1% air bleed and a 2% air bleed.

The reference MEA (MEA #1) was reasonably CO tolerant with 1% air bleed, however, the cell performance at 60° C. was 100 mV below that of dilute CO-free hydrogen at 0.5 A/cm². Furthermore, even with an air bleed of 2% there is very little performance improvement for MEA #1.

In contrast, the bi-layer MEA of this invention (MEA #2) reached the CO-free hydrogen baseline performance with only 1% air bleed even at 0.9 A/cm². As such, the MEA of the first embodiment portrays greatly improved CO tolerance in the presence of less air bleed at the same total anode catalyst loading.

As can be seen from the foregoing description, the present invention provides both a membrane electrode assembly and a fuel cell that has an improved tolerance in the presence of CO. More particularly, the utilization of a PrOx catalyst that is directly exposed to the reformate fuel stream oxidizes the CO prior to the fuel stream contacting the electrocatalyst that is active in the electrochemical oxidation of $H_2$, enables such advantages as a reduced air bleed at a CO concentration of 100 ppm and enhanced current density. Furthermore, the present invention enables the use of fuel streams with higher CO concentrations in the presence of typical air bleed levels of 2-4%.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electrochemical cell comprising a proton exchange membrane, an electrically conductive fluid distribution element comprising catalyst particles, an electrode having a first surface in contact with said proton exchange membrane and a second surface facing said electrically conductive fluid distribution element, and a flow path from said fluid distribution element to said electrode and toward said membrane, wherein said catalyst particles are disposed on a surface of said fluid distribution element facing said second surface of said electrode, where said particles comprise PtM, where M comprises one or more non-noble metals, and alloys and mixtures thereof, which catalyze oxidation of carbon monoxide.

2. The cell of claim 1, wherein said catalyst particles comprise particles of said PtM supported on support particles.

3. The cell of claim 2, wherein said support particles are electrically conductive.

4. The cell of claim 2, wherein said support particles are selected from the group consisting of carbon, graphite, silicon carbide, metal oxide, transition metal oxide, silica, alumina and mixtures thereof.

5. The cell of claim 2, wherein said PtM is PtFe; and said support particle is an electrically conductive particle selected from the group consisting of carbon, graphite, and silicon carbide.

6. The cell of claim 1, wherein said PtM is selected from the group consisting of PtFe, PtSn, and alloys and mixtures thereof.

7. The cell of claim 1, wherein said catalyst particles are dispersed in a binder.

8. The cell of claim 1, wherein said catalyst particles comprise metal catalytic particles supported on support particles; and wherein electrically conductive particles are dispersed among said support particles.

9. The cell of claim 1, wherein said PtM is an electrically conductive black metal.

10. An electrochemical cell comprising a proton exchange membrane, an electrically conductive fluid distribution element, an electrode having a first surface in contact with said proton exchange membrane and a second surface facing said electrically conductive fluid distribution element, a flow path comprising as diffusion media and extending from said fluid distribution element to said electrode and toward said membrane, catalyst particles disposed on said gas diffusion media and retained thereon by a binder, where said particles comprise PtM, where M comprises one or more non-noble metals, and alloys and mixtures thereof, which catalyze oxidation of carbon monoxide.

11. The cell of claim 10, wherein said gas diffusion media comprises electrically conductive fiber, said binder is ionically conductive, and said catalyst catalyzes electrochemical reaction to release protonic hydrogen.

12. An electrochemical cell comprising a proton exchange membrane, an electrically conductive fluid distribution element comprising catalyst particles, an electrode having a first surface in contact with said proton exchange membrane and a second surface facing said electrically conductive fluid distribution element, and a flow path from said fluid distribution element to said electrode and toward said membrane, wherein said catalyst particles are disposed on a surface of said fluid distribution element facing said second surface of said electrode, where said particles comprise PtM, where M comprises one or more non-noble metals, and alloys and mixtures thereof, which catalyze oxidation of carbon monoxide, wherein said electrically conductive fluid distribution element is defined by a plurality of lands and channels; and wherein said catalyst particles are disposed on at least said channels.

13. An electrochemical cell comprising:
a proton exchange membrane;
an electrically conductive fluid distribution element;
an electrode having a first surface in contact with said proton exchange membrane and a second surface facing said electrically conductive fluid distribution element;
a flow path extending from said electrically conductive fluid distribution element to said electrode and toward said membrane;
gas diffusion media disposed in said flow path between said electrically conductive fluid distribution element and said electrode, said gas diffusion media comprising a binder; and
catalyst particles disposed on said gas diffusion media and retained thereon by said binder, where said particles comprise PtM, where M comprises one or more non-noble metals, and alloys and mixtures thereof, which catalyze oxidation of carbon monoxide.

* * * * *